United States Patent [19]
Armstrong et al.

[11] 3,848,225

[45] Nov. 12, 1974

[54] CORRELATION SONAR

[75] Inventors: Alvin E. Armstrong, Dallas;
Kenneth R. Slater, Richardson, both of Tex.

[73] Assignee: Texas Instruments Incorporated, Dallas, Tex.

[22] Filed: Nov. 16, 1961

[21] Appl. No.: 153,781

[52] U.S. Cl. .................... 340/3 R, 340/3 D, 343/9
[51] Int. Cl. ......................... G01s 9/68, G01s 7/62
[58] Field of Search ......... 343/8, 9, 100.7, 13, 17.1, 343/17.2; 340/3, 5 S, 1, 3 D

[56] References Cited
UNITED STATES PATENTS

| | | | |
|---|---|---|---|
| 2,451,822 | 10/1948 | Guanella | 343/12 |
| 2,476,032 | 7/1949 | Feldman et al. | 343/8 |
| 2,676,206 | 4/1954 | Purington | 343/13 |
| 2,743,438 | 4/1956 | Page | 343/9 |
| 2,885,590 | 5/1959 | Fuller | 343/100 CL |
| 2,896,162 | 7/1959 | Berger et al. | 343/100 CL |
| 2,926,243 | 2/1960 | Camp | 343/100 CL |
| 2,989,726 | 6/1961 | Crawford | 343/100 CL |

*Primary Examiner*—Richard A. Farley
*Attorney, Agent, or Firm*—Harold Levine; Rene' E. Grossman; Alva H. Bandy

EXEMPLARY CLAIM

1. In sonic ranging the method which comprises at a sending-receiving station transmitting a first pulse having a predominant frequency in the upper sonic range, in the time interval following said first pulse sensing acoustic vibrations returning to said sending-receiving station to produce a received signal which includes components representative of echoes of said pulse, the frequency of which is modified relative to the frequency of said pulse in dependence upon the relative velocities between said sending station and any object producing said echoes, producing at least two separate recordings of said received signal, reproducing the recorded signals, generating a pair of high frequency signals each representative of said received signal with the first high frequency signal shifted in time relative to the second high frequency signal by an amount of the order of one-half the duration of said pulse to bring into time coincidence different time segments of the echo components, generating a timing function which repeatedly varies monotonically from a predetermined level occurring in known time relation to the instant of transmission of said pulse, generating a reference signal which varies in frequency in dependence upon said timing function, mixing said reference signal with both of the first and second high frequency signals to produce side band components, detecting said side band components to produce a pair of output signals, and generating a signal from the product of said pair of output signals.

4 Claims, 3 Drawing Figures

CORRELATION SONAR

This invention relates to sonic ranging and more particularly to ranging pulse correlation.

In the art of sonic ranging, commonly known as "sonar", identification and location of a given reflecting object or target within a sonic range are often ambiguous and data is indefinite by reason of the presence of extraneous noise. Various methods and systems have been devised for improving sonar to enhance the resolution but substantial problems still remain.

Three problems that are most pressing in many sonar systems are limited range, limited search rates and limited detection probabilities. To overcome the same the present invention involves a technique of signal enhancement by utilizing narrow bandwidths together with pulse correlation. The present system may be characterized as narrow band doppler-frequency scanning sonar. More particularly, signals of a given frequency are employed, and the return echoes are processed by frequency multiplication and correlation to provide a significantly increased detection probability and significantly increased range. At the same time the target range rate is determined by frequency scanning the returned signals or echoes.

In a preferred embodiment of the invention, pulses of a predetermined frequency are employed to permit initial separation and identification of the resulting echo signals. Filters are employed to separate the received signals from noise having frequencies outside of a band containing the echo signals. Two signals are stored on separate channels and delayed one with respect to the other so that one echo component from a transmitted pulse is in time coincidence with a different echo component of the same pulse reflected from the same target. In addition to increasing the detection probability by utilizing signals having different noise spectra and correlating them, a doppler frequency scanning system is provided in a preferred embodiment of the invention for a spectrum analysis of the dopplerized echoes. Output signals from two or more channels wherein such spectrum analysis is performed are then applied to the inputs to a multichannel multiplying system which may broadly be referred to as a correlator detector. Only the simultaneous presentation of signals to all inputs to the detector will produce an output signal which is keyed to the relative velocity between the points of transmission of the acoustic pulses and the target.

For a more complete understanding of the present invention and for further objects and advantages thereof, reference may now be had to the following description taken in conjunction with the accompanying drawings in which.

Figure 1:
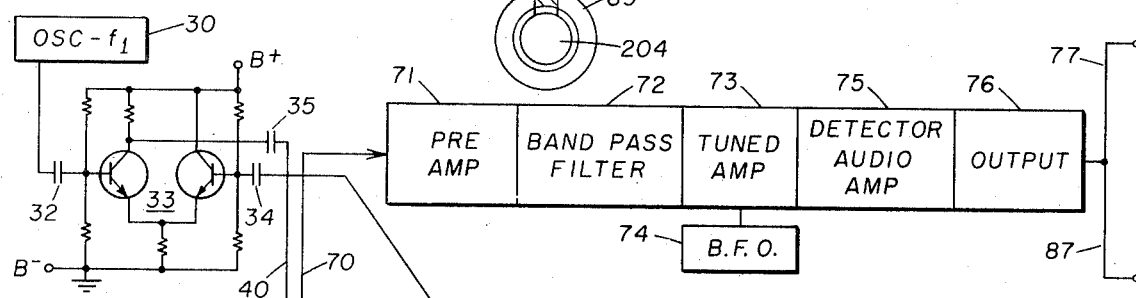
FIG. 1 is a schematic view partially in block form of a portion of the system of the present invention.
Figure 1:
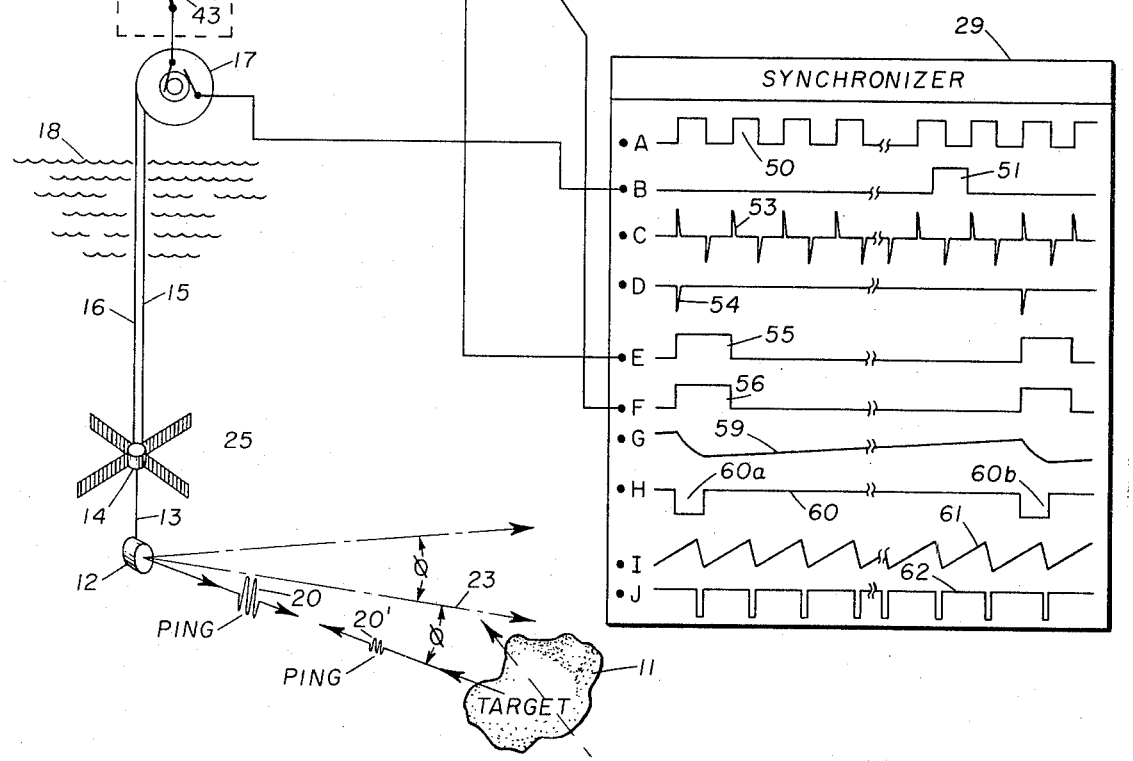
Figure 2:
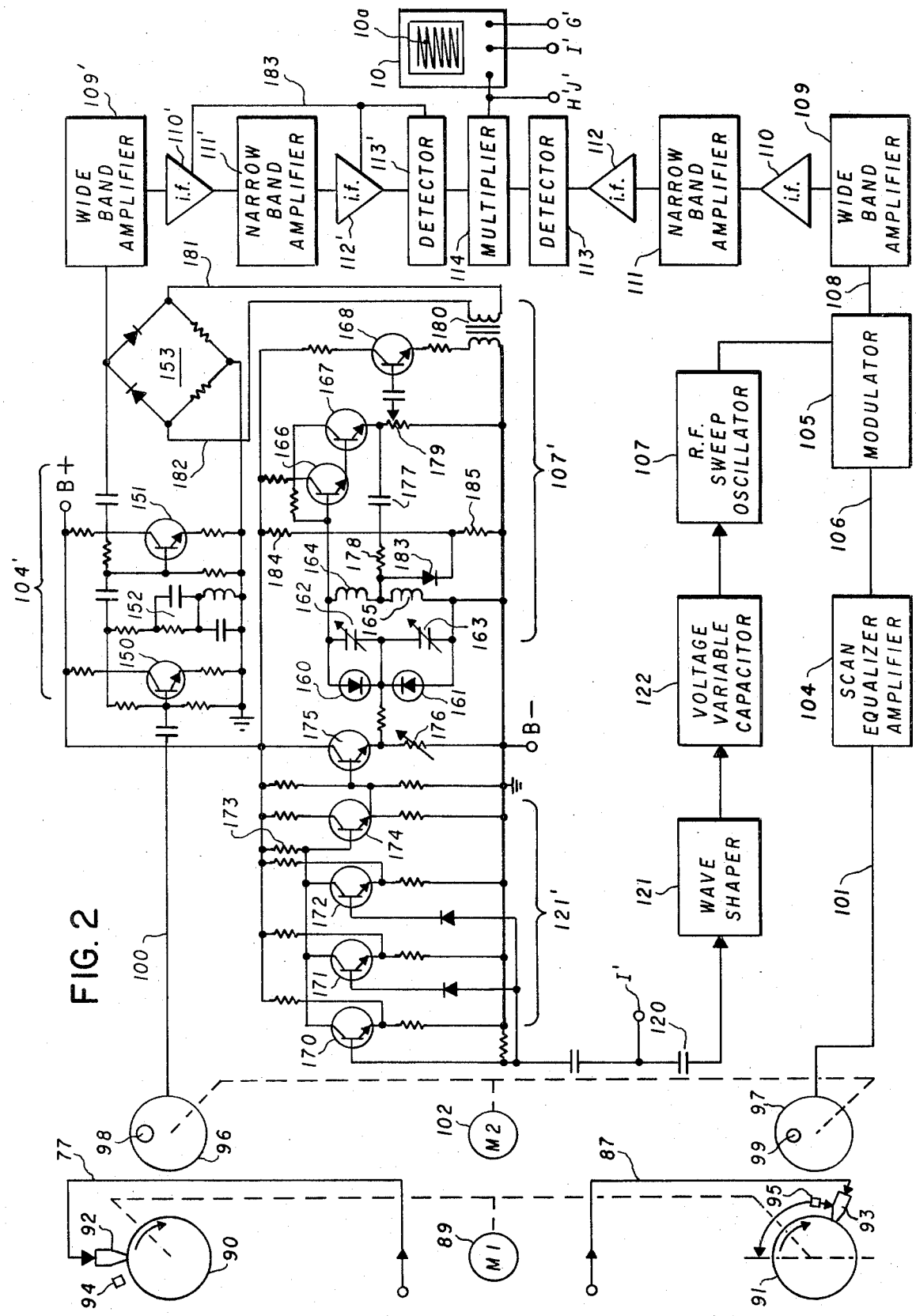
FIG. 2 is a diagram of the remaining components of the system of FIG. 1.

Referring now to FIGS. 1 and 2, there is illustrated a system, partly in block diagram form and partly in detailed schematic form, for providing a presentation on an oscilloscope 10 which represents the range and the range rate of a target 11 relative to the transducer 12. There is to be presented repetitively on the face of the oscilloscope 10 a spot such as the spot 10a. The position of the spot from the bottom of the raster is to be in terms of the distance between the target 11 and the transducer 12. The distance of the point 10a from the center line of the oscilloscope face is to be in terms of the relative velocity between the target 11 and the transducer 12.

A specific embodiment of the invention shown in FIGS. 1 and 2 and now to be described is based upon the repetitive transmission of a relatively long acoustic pulse of constant frequency oscillations.

A transducer 12 is coupled by a linkage 13 to a driver-stabilizer unit 14 which in turn is supported by a cable, including channels 15 and 16, leading to a reel 17. In practice, the reel 17 will be supported at or above the surface of a water level 18 as by means of a helicopter or ship or the like. In a most useful mode of operation the transducer 12 is lowered from a helicopter at a selected location over a water-covered area. At such location a series of measurements are made to sense the presence, the location and velocity of a submerged object, a submarine or the like forming the target 11, relative to the transmitter 12. In this embodiment of the invention the transducer 12 is repeatedly energized to produce a pulse 20 upon each energization. The pulse 20 preferably is in the upper audio frequency range, for example of about 19.5 kilocycles per second. The pulses are beamed from the transducer 12 which preferably is highly directional so that the cone of influence is fairly limited. Each pulse then travels to any target within the cone, such as target 11, where it is reflected. The echo 20' then travels back to the transducer 12 where it is detected for utilization in the data processing system hereinafter to be described. Following each search cycle, including transmission of at least one pulse and detection of echoes thereof, the unit 14 is energized to rotate the transducer 12 through an angle such as angle $\phi$ so that a subsequent search cycle will be beamed in a new direction such as along axis 23. In practice, angles of 5° have been found to be satisfactory. An azimuthal angle of 360° is periodically probed by stepping the transducer 12 in 5° steps. The unit 14 includes a plurality of vanes such as the vanes 25 which serve as stabilizers, permitting the transducer 12 to be moved by rotation of the linkage 13 in fixed increments or steps.

The transducer 12 may be of any of the well-known devices which are adapted to transmit as well as to receive acoustic energy in a relatively narrow cone of influence. The transducer 12 is excited for the transmission of the pulse 20 from a source including an oscillator 30 which runs continuously at output frequencies of 19.5 kilocycles per second.

Oscillator 30 is connected by way of capacitor 32 to a first input of a coincidence amplifier 33. The second input to amplifier 33 is applied by way of coupling capacitor 34 which is connected to the output terminal F of a synchronizer 29. The coincidence amplifier 33 may be considered to be a transistorized and-gate well-known both as to construction and operation. The output signal from the gate 33 is derived from the collector electrode of the input stage. The output is transmitted by way of coupling capacitor 35 to the input of a power amplifier 41.

The output of the power amplifier 41 then is applied to a duplexer unit 42 which is diagrammatically represented by switch 43. Switch 43 is connected to one cable channel 15 by way of suitable brushes on the reel 17. By this means signals from the power amplifier 41 are applied to the transducer 12.

The control of the gate 33 is such that the pulse 20 is of the order of 100 milliseconds long.

The synchronizer 29 has been shown in block form only and preferably will include a frequency standard such as a regulated oscillator to provide a preset time base for the control of all the timing operations in the system. A plurality of distinct control functions are produced in and utilized from the synchronizer 29. The principal control functions have been illustrated both as to waveform and their relative time relationships on the face of the synchronizer 29. It is to be understood that electrical functions corresponding with such waveforms are available at the output terminals A–J. Some of the waveforms are used internally by the synchronizer. However, where they are used externally in FIG. 2 electrical connections to FIG. 2 have been omitted for convenience in illustration. It is to be understood that control signals are applied from points G, H, I, and J of synchronizer 29 to the circuit of FIG. 2 to points G', H', I', and J', respectively, the points bearing corresponding labels being electrically common.

The waveforms illustrated in FIG. 1 represent one cycle of operation of one embodiment of the invention. The cycle covers a time interval of several seconds, depending upon the range selected as hereinafter described. The synchronizer 29 includes a timing oscillator regulated as to frequency. Its output is modified to provide output timing pulses in the form of the square waves 50. The length of each pulse is 62.5 milliseconds. The waveform 50 serves as a timing base for operation of the system.

The waveform appearing at terminal B includes an energizing pulse 51 which is applied by way of the reel 17 and channel 16 to the unit 14 preferably near the end of each cycle to step the transducer 12 from one position to another. The waveform 50 which may appear at terminal A is differentiated to produce the series of positive and negative gating pulses 53. A selected one of the pulses 53 which appears after each of the pulses 51 is then employed as at the terminal D to initiate a new cycle of operations.

In each such cycle there first is generated a gating pulse 55 about 125 milliseconds long which appears at terminal E which is connected to the solenoid 44 controlling switch 43 and a second switch 45. The energization of relay coil 44 enables the amplifier 41 to amplify signals from oscillators 30 and 31 for transmission by way of switch 43 to transducer 12. At the same time, the switch 43 closes the circuit between the power amplifier 41 and the reel 17.

Also produced, at terminal F, is a gating pulse 56 which is transmitted by way of the coupling condenser 34 to the gate 33. The gating pulse 56 is of duration of 125 milliseconds.

Coincident with the midpoint of the pulse 56 there is initiated the vertical sweep voltage having waveform 59. The sweep voltage appears at terminal G and is applied to the vertical sweep input terminal G' on the display device 10.

There also is produced a cathode-ray blanking signal 60 which has negative pedestals 60a and 60b which serve to blank the cathode-ray at the end of each vertical scanning cycle.

A horizontal sweep voltage represented by the waveform 61 also is produced by synchronizer 29. The horizontal sweep voltage 61 is of much higher repetition rate than the vertical sweep so that there is produced a raster on the display device 10. The raster is of relatively low frequency, sweeping vertically over an interval dependent upon the range to be explored. For a range of 6,000 yards the sweep voltage 59 has a period of 7.5 seconds. Ranges of 3,000 yards and 1,500 yards may be selected by utilizing vertical sweep voltages having periods of 3.75 seconds and 1.875 seconds, respectively.

The start of each horizontal sweep voltage cycle coincides with the trailing edge of each of the positive pedestals in the waveform 50. The period of the horizontal sweep is 125 microseconds. During the flyback interval in each horizontal sweep voltage cycle, a blanking pulse is produced. Such blanking pulses are represented by the waveform 62.

Thus far described is the energization of the transducer 12 for repeated production of the pulse 20 together with the waveforms in the synchronizer 29 the use of which will now further be explained in connection with processing of received pulse data. At the end of the waveform 55 the duplexer 42 connects the transducer 12 to a receiver channel 70. The channel 70 includes a pre-amplifier 71, a band-pass filter 72 which is tuned sharply to the frequency of oscillator 30 and thus passes only frequencies at or closely adjacent to 20 kilocycles. Channel 70 includes a tuned amplifier 73 to which there is connected a beat-frequency oscillator 74. By beating the information signal on channel 70 with the signal from oscillator 74, the information components at 19.5 kilocycles are shifted slightly therefrom in dependence upon doppler effects and are translated to a frequency in the low audio range. A detector and audio amplifier stage then follows comprising the unit 75 which in turn is followed by an output unit 76.

It will be recognized that one purpose of the present system is to determine the distance between the target 11 and the transducer 12. A second purpose is to determine the velocity of the target 11 relative to the transducer 12. It is well-known that the frequency of the return echo 20' will differ from the frequency of the transmitted pulses 20 in dependence upon the velocity of the target 11. The doppler effect is well-known. For ranges of relative velocities between the target 11 and the station 12 from +30 knots to −30 knots, the range of signal frequencies expected at the output of detector 75 would be of the order of from about 400 to 1,200 cycles per second. For a zero velocity of the target 11 the frequency of the beat-frequency oscillator 74 is selected with reference to the frequency of the signals from oscillator 30 such that the output frequency at the detector 75 would be 800 cycles. If the target 11 is moving directly toward the transducer 12 at a rate of 30 knots, then the frequency of the signal at the detector 75 would be of the order of 1,200 cycles per second. If the target 11 is moving directly away from the transducer 12 at 30 knots, the signal from detector 75 would be of the order of 400 cycles per second. The band-pass filter 72 selects this range of frequencies from oscillator 30 as doppler modified. The echo pulses are channeled through two paths in a correlating system hereinafter to be described so that the signal-to-noise ratio may be enhanced.

The noise level at the transducer 12 may be sufficiently high to obscure any reflections from target 11. It would be desirable regardless of noise levels within the ranges encountered to be able to extract the reflection information from the noise-signal combination and utilize such data to provide the positive identification or range and/or range rate.

The present invention has been found to provide considerable improvement in this direction.

The first and last halves of signal 20 are characterized by different noise spectra by reason of the time displacement therebetween. This difference is utilized in doppler-sweep correlation to permit enhancement of the signal-to-noise ratio. This is accomplished, as will be explained in connection with FIG. 2, by the utilization of the relatively low frequency audio signals appearing at the output stage 76.

The beat-frequency oscillator 74 and detector 75 are employed to reduce the effective frequencies of the information signals to frequencies suitable for recording on a relatively low speed magnetic recording medium. The signals recorded magnetically are then multiplied in frequency to be in a frequency range considerably higher than the frequencies of pulse 20. At such frequencies they may be treated positively as well as more conveniently than at low frequencies to extract data peculiarly related to the reflection phenomena at the target 11.

More particularly, referring to FIG. 2 a dual recording system is provided. The signals from output stage 76 are sent through a pair of channels 77 and 87 to a pair of recording heads 92 and 93. The recording heads 92 and 93 which transfer the signals to a pair of magnetic drums 90 and 91 are displaced one with respect to the other by an angle which is equivalent to a time delay of 62.5 milliseconds or half the time duration of pulse 56. By this means there may be recorded in time coincidence on the drums 90 and 91 the components of the input signals to the recording heads 92 and 93, which are representative of the first and last halves of return echoes 20'.

Drums 90 and 91 are driven by a motor 89. Motor 89 drives the drums at a relatively low speed. The speed of motor 89 is selected with due reference to the frequency of the signals from the channels 77 and 87, or vice versa.

The signals recorded on the drums 90 and 91 are continuously recorded and are erased by erase heads 94 and 95 which are positioned immediately ahead of the record heads 92 and 93, respectively. Information stored on the drums 90 and 91 is continuously scanned at a high rate by scanning disks 96 and 97. The scanning disks each includes at least one reproducing head such as the heads 98 and 99 which produce signals on the output channels 100 and 101, respectively, which signals include components representative of the return echoes 20'. However, the scan disks 96 and 97 are driven by a motor 102 which rotates them at a very high speed so that the frequencies of all components of the return echo signals 20' and noise components are highly multiplied. More particularly, the signals recorded on the drums 90 and 91 are in the range of from about 400 to 1,200 cycles per second whereas the corresponding signals appearing on channels 100 and 101 will be in the range of from about 15 to 50 kilocycles. By this means the audio signals from the receiver channels 77 and 87 of FIG. 1 are multiplied into ultrasonic signals by the frequency multiplier-recorders.

In this embodiment of the invention the frequency multiplication was obtained by recording the audio signals on a magnetic drum revolving at 295 revolutions per minute and scanning the recorded signal at 12,000 revolutions per minute. The ratio of the speeds produced a multiplication factor of 40.6:1. An audio output of 391 to 1209 cycles per second (for the expected target speeds of up to ±30 knots) such as would be received on channel 77 from the 19.5 kilocycle pulses was increased to a range of frequencies of from 15.89 to 49.0 kilocycles. The other signal appearing on channel 87 was similarly raised in frequency. At the same time, by reason of the displacement as between the record heads 92 and 93, the first half of echo signal components from echo 20' was delayed to coincide with the last half of echo signal components from echo 20'.

The channels 100 and 101 are connected to a spectrum analyzer where they are amplified and equalized in the equalizer amplifier 104 for distortions in the recorder. They are then transmitted to a modulator 105 where the incoming signal on channel 106 is mixed with a variable frequency signal from a sweep oscillator 107. The spectrum analyzer sweep oscillator 107 is synchronized with the horizontal sweep voltage 61 of FIG. 1 to vary, for the above example, from 207.89 to 241 kilocycles. As the output from the sweep oscillator 107 sweeps through this range, signals appearing at the input channel 106 having frequency components within the 15.89 to 49.0 kilocycle band are scanned and would produce a frequency difference signal at the output channel 108 of the modulator 105, the lower side band being selected by the succeeding narrow band components of the system which are tuned to 192 kilocycles per second. Since the sweep oscillator 107 is synchronized with the horizontal sweep voltage applied to the display device 10, it repeatedly sweeps the range of frequencies which may possibly appear within the doppler region.

The output of the modulator 105 then is applied through a wide band amplifier 109 tuned fairly broadly to 192 kc., then to an intermediate frequency amplifier 110, a narrow band amplifier 111 tuned sharply to 192 kc., an intermediate frequency amplifier 112 and a detector 113. The output from detector 113 is in the nature of a pulse which appears when the difference between the time variable sweep voltage and the signal component frequency is equal to 192 kilocycles per second.

The pulse output from unit 113 is positioned in time with reference to the beginning of the vertical sweep voltage in proportion to the time of travel of pulse 20 from the transducer 12 to target 11 and back. The pulse output is positioned in time with reference to the horizontal sweep voltage in dependence upon the relative velocity between the target 11 and the transducer 12.

The pulse output from the detector 113 is applied to a first input terminal of a multiplier 114 whose output is connected to the intensity control input of the display device 10. When a signal is applied from channel 100 to the second input terminal of multiplier 114 in time coincidence with the signal from detector 113, then a spot will appear on the raster in display device 10 which will indicate directly both the range and the range rate as sensed by the pulses of FIG. 1.

The first and last halves of received signal segments which contain the echo signal 20' have different noise spectra. Similarly, the recording and playback systems for frequency multiplication of the two channels have different noise spectra. By effectively superimposing on a time basis the first and last halves of the information signal carrying a code or key which is dependent upon the frequency of the transmitted pulses the superimposition of the two halves of the signal enhances the signal-to-noise ratio sufficiently to extend the range beyond that of more conventional sonar systems. If the multiplier 114 does not receive a signal from both channels in time coincidence, then no indication will appear on the display device 10. The system is sufficiently selective that it may employ extremely narrow information bands and yet retain the time information represented by the return echoes. It will be noted that the sweep oscillator 107 is controlled by the sweep voltage which is applied to terminal I' and is transmitted by way of coupling condenser 120 to a wave-shaper 121 and thence to a variable voltage capacitor 122. The capacitor in the unit 122 is so controlled that the output frequency from the sweep oscillator varies linearly with time beginning with each cycle of the horizontal sweep voltage. The channel 101 and its associated components have been shown in block form to permit a general understanding of the mode of operation of the invention. The channel 100 has been illustrated in greater detail to clarify the operation.

The following is a brief description of the more detailed circuit diagrams of FIG. 2.

The channel 100 is connected to the input terminal of a scan-equalizing amplifier 104'. It is known, of course, that the outputs of the scan or playback heads 98 and 99 are nonlinear with frequency. The peak is near the center frequency of 32 kilocycles for the above-identified range. The scan-equalizer amplifier 104' provides an output proportional to the input signal amplitude but is insensitive to frequency changes in the 15.89 to 49.0 kilocycle range. The equalizing network connected between the two stages 150 and 151 provides a varying collector load impedance for the first stage 150. The impedance and therefore the gain of this amplifier is low at the center frequencies where the scan head response is high, and high where the scan head response is low. The equalizer network also is designed to attenuate frequencies outside of the 15.89 to 49.0 kilocycle band. The second stage 151 provides amplification and isolates the equalizing network 152 from the succeeding modulator unit.

The modulator comprising a bridge network 153 mixes a variable frequency sweep signal from the sweep oscillator 107' with the 15.89 to 49.0 kilocycle signal at the output of the stage 151 to produce a 192-kilocycle intermediate frequency with information contained in the upper and lower side bands. The 192-kilocycle i.f., signal appears when the frequency of the signal at the output of stage 151 differs from the variable frequency signal from the sweep oscillator 107'. The sweep oscillator 107' sweeps through a frequency range of from 207.89 to 231 kilocycles, the amplitude of the i.f., signal being dependent upon the amplitude of the input signal.

The sweep oscillator 107' provides a variable sweep frequency for mixing with the signal from the frequency multiplier to provide the 192-kilocycle i.f. In the system illustrated the sweep oscillators 107 and 107' are controlled by voltage variable silicon capacitors. In such capacitors it can be shown that the capacity varies in the following manner:

$$C = K/\sqrt{V}$$

where
 $C$ is the capacitance;
 $K$ is the constant of proportionality; and
 $V$ is the externally applied voltage.

If L, the inductance of an L-C circuit, is constant, the resonant frequency is expressed as follows:

$$f = 1/2\pi \sqrt{LC} = K_1/\sqrt{C}$$

where
 $K_1 = 1/2\pi \sqrt{L}$.

Therefore, with a voltage-dependent capacitor as the tuning element, the frequency will vary as follows:

$$f = k(V)^{1/4}$$

where $$k = K_1/\sqrt{K}.$$

That is to say, for a linear frequency change the voltage applied to the silicon capacitor must have a fourth power characteristic. The silicon capacitors in the circuit 107' comprise the two silicon units 160 and 161. Units 160 and 161 are connected in parallel with fixed capacitors 162 and 163 which in turn are connected in parallel with inductances 164 and 165.

The capacitors 160, 161, 162 and 163 together with the inductances 164 and 165 form a resonant tank circuit in the oscillator which is a modified Hartley circuit. The oscillator circuit, including the tank circuit, employs the units 166, 167 and 168.

The circuit 121' provides an output signal which represents a fourth power function of the horizontal sweep voltage represented by waveform 61. It will be remembered that a sweep voltage having the latter waveform is the input voltage at terminal I' of circuit 121'. Circuit 121' serves to generate the desired fourth power curve by a number of straight line approximations. The three transistors 170, 171 and 172 are differently biased so that as the input at terminal I' increases linearly from zero, transistor 170 conducts first with transistors 171 and 172 cut off. When the input voltage reaches a desired level, transistor 171 begins to conduct. When the input voltage reaches a third preset level, transistor 172 begins to conduct. All three currents flow through the common collector load resistance 173 at the base of amplifier 174. The signal is then referred back to ground by the inverter amplifier 174.

The fourth power control voltage is then applied to the transistor 175 which forms a part of an emitter-follower circuit having a variable emitter resistor 176 for adjusting the initial D.C. bias on the variable capacitors 160 and 161. In oscillator 107' regenerative feedback is provided through a capacitance 177 and the resistance 178. The output voltage from the oscillator is thus developed across the potentiometer 179 and applied to the base of the emitter-follower 168. The diode 183 and resistors 184 and 185 provide an amplitude-limiting control to give a linear voltage output from the oscillator 107'. The signal is then applied to the primary of a transformer 180 by way of a load resistor. The signal from the secondary winding of the transformer 180 is applied by way of conductors 181 and 182 to the terminals of the modulator 153.

The pass band of the filter in amplifier 109' is 192±2 kilocycles with the response down 20 decibels at 192±5 kilocycles. The signal presented to the wide band amplifier by the modulator 153 is a wide band of noise and signal in which weak signals are obscured. However, since only a 4 kilocycle portion of the band is passed, the signal-to-noise ratio is effectively increased. The reduction in the noise outside of the band also prevents overloading of the following stages.

The i.f., amplifiers 110' and 112' are located ahead of and following a narrow band-pass filter unit 111'. The i.f., amplifiers are of conventional design. Negative output from the detector 113' is applied by way of channel 183 to the i.f., stages 110' and 112' for automatic gain control purposes.

The velocity resolution of this system depends upon the ability of the correlator-detector system of FIG. 2 to separate two adjacent signal frequencies. Therefore, the narrow band-pass filter 111' should be as narrow as possible and yet wide enough that no signal can be overlooked. The minimum band width required to eliminate filter transient interference due to the sweeping rate may be shown to present the following limitations. For the most severe condition assume that the sweep oscillator frequency required to mix with the signal frequency to produce a 192 kilocycle signal occurs midway along the signal pulse 20'. Assume also that there must be coincidence of at least one-fourth of the signal pulses from the two channels. In this case the minimum bandwidth of the filter 111' can be shown to be of the order of 500 cycles. This corresponds with an "apparent" band width of $500 \times 1.3 = 650$ cycles. Referring this apparent band width to the input, this corresponds to a 16 cycle band width which will permit resolution of velocity of the target 11 to approximately 1.17 knots.

The system thus far described involves the use of transmitted acoustic pulses of fixed frequency. The return echoes of the signals are then recorded on two channels. They are processed through an analyzer system which is sensitive to the signals related in a known manner to the frequency of the transmitted acoustic pulses. An output signal is then provided only if evidence of return echo signals appears, the first and last half of a signal segment being representative of the length of the transmitted pulse. It is necessary in order to carry out the invention as above described that the spaced time segments of the received signal be superimposed as is effected through the offset of the record heads in the frequency multiplier-recorder system. It is preferable that the two time periods be adjusted precisely in dependence upon the length of the transmitted acoustic pulses.

The transmitted pulse is a single pulse uninterrupted over a period of 125 milliseconds. The return echo signal is recorded on two drums 90 and 91. The record heads 92 and 93 are offset so that the last half of the signal from drum 90 overlaps the first half of the signal on drum 91. The noise spectra in the first half differs from the noise spectra in the latter half. At the same time the internally generated noises relative to the operation of the frequency multiplication system will be different. It has been found that such correlation of the last half with the first half of the pulse is effective in enhancing the signal-to-noise ratio.

Figure 3:
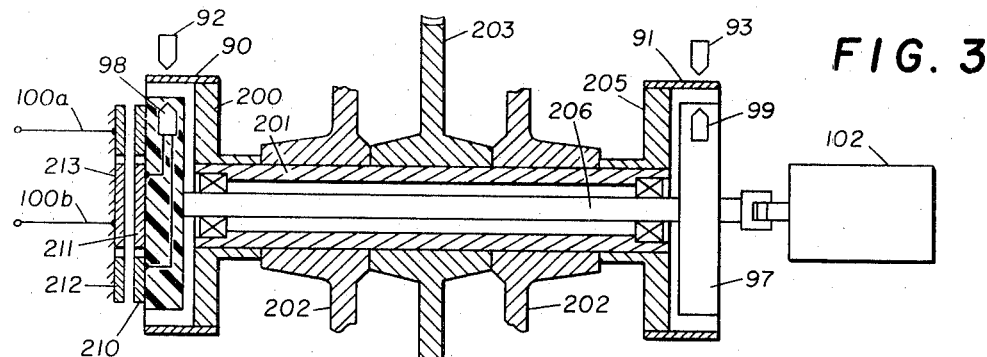
FIG. 3 is a sectional view of a frequency multiplier unit.

By way of further explanation as to the operation of the frequency multiplying system, reference may be had to FIG. 3. FIG. 3 is a sectional view taken along the center axis of the recording and scanning system. Where consistent, the same reference characters have been given in FIG. 3 as in FIG. 2. The recording drum 90 is a relatively short cylinder of a magnetic recording medium such as may be formed from suitable nickel-cobalt alloys. The recording segment proper is a thin cylindrical membrane which is supported by a disk 200. The recording drum 90 extends from the surface of the disk 200 to form a cup-shaped aperture.

The recording head 92 (along with the erase head 94, not shown) is mounted in fixed positions adjacent to the outer surface of the drum 90. The disk 200 is mounted on an outer shaft 201 which is journaled in bearings in the support elements 202. The outer shaft 201 is secured to a reduction gear 203. The motor 89 drives a worm gear 204 which meshes with the reduction gear 203 to drive the drum 90 relative to the record head 92. The second record drum 91 is similarly mounted on shaft 20 by a disk 205 so that it rotates with the drum 90.

An inner shaft 206 is provided which is journaled internally of the shaft 201. The shaft 206 carries the scan disk 96, supporting the same within the cup formed by the drum 90 and the disk 200. The scan disk 96 includes the scan head 98. The second scan disk 97 carrying the scan head 99 also is mounted on shaft 206 to scan signals recorded on drum 91. The central shaft 206 is driven by the motor 102. The drums 90 and 91 rotate in direction opposite the direction of rotation of the scan disks 96 and 97. In the specific embodiment above described the drums 90 and 91 were driven at the relatively low speed of 295 r.p.m., whereas the scan disks were driven in the opposite direction at a speed of 12,000 r.p.m.

Each of the scan disks includes on an outer face thereof a conductive ring such as the ring 210 and a central conductive disk 211. The scan head 98 has its two terminals connected to the ring and to the disk 211, respectively. A stationary ring 212 and a stationary disk 213 mounted on the housing or case in which the drum is mounted serve as terminals for the capacitive transfer of signals from the scan head 98 to the signal channel 100. In FIG. 3 the conductors 100a and 100b comprise the signal channel 100 of FIG. 2. A similar capacitive coupling is provided for the scan disk 97 so that the two signals may be reproduced for application by way of channels 100 and 101, FIG. 2, to the analyzing system. Thus, input signals are continuously recorded on the drums 90 and 91 and are continuously erased by the erase heads, such as heads 94 and 95, FIG. 2. The scan heads 98 and 99 continuously pickoff the data recorded on the recording drum.

Having described the invention in connection with certain specific embodiments thereof, it is to be understood that further modifications may now suggest themselves to those skilled in the art and it is intended to cover such modifications as fall within the scope of the appended claims.

What is claimed is:

1. In sonic ranging the method which comprises at a sending-receiving station transmitting a first pulse having a predominant frequency in the upper sonic range, in the time interval following said first pulse sensing acoustic vibrations returning to sending-receiving station to produce a received signal which includes components representative of echoes of said pulse, the frequency of which is modified relative to the frequency of said pulse in dependence upon the relative velocities between said sending station and any object producing said echoes, producing at least two separate recordings of said received signal, reproducing the recorded signals, generating a pair of high frequency signals each representative of said received signal with the first high frequency signal shifted in time relative to the second high frequency signal by an amount of the order of one-half the duration of said pulse to bring into time coincidence different time segments of the echo components, generating a timing function which repeatedly varies monotonically from a predetermined level occurring in known time relation to the instant of transmission of said pulse, generating a reference signal which varies in frequency dependence upon said timing function, mixing said reference signal with both of the first and second high frequency signals to produce side band components, detecting said side band components to produce a pair of output signals, and generating a signal from the product of said pair of output signals.

2. A sonic ranging system which comprises means at a sending-receiving station for transmitting a first pulse having a predominant frequency in the upper sonic range, means at said station for sensing acoustic vibrations returning to said sending-receiving station in the time interval following said pulse to produce a received signal which includes components representative of echoes of said pulse, the frequencies of which are modified relative to the frequencies of said pulse in dependence upon the relative velocities between said sending station and the object producing said echoes, a pair of recording media separately receiving said received signal to produce two recordings thereof, means for reproducing the recorded signals, means for generating a pair of high frequency signals from the reproduced signals which are representative of said received signal with the first high frequency signal shifted in time relative to the second high frequency signal by an amount of the order of one-half the duration of said pulse to bring into time coincidence different time segments of the echo components, means for generating a timing function which repeatedly varies monotonically from a predetermined level occurring in known time relative to the instant of transmission of said pulse, means for generating a reference signal which varies in frequency in dependence upon said timing function, means for mixing said reference signal with each of the first and second high frequency signals to produce side band components, means for detecting each of said side band components to produce a pair of output signals, and means for generating a signal representative of the product of said pair of output signals.

3. In sonic ranging the method which comprises at a sending-receiving station transmitting time-spaced short trains of single frequency acoustic pulses, sensing acoustic vibrations returning to said sending-receiving station to produce a pair of received signals which may include components representative of echoes of said acoustic pulses, shifting one of said pair of received signals in time relative to the other to misalign the same reflection components in said pair of signals while maintaining a partial time overlap between said pair of signals, and generating a pair of output pulses, one from each said signal, each dependent solely upon occurrence therein of components having frequencies within a narrow band of echo signal frequencies centered at said single frequency, and generating an indicating signal dependent upon time coincidence between pulses in said signals.

4. A sonic ranging system which comprises a sonic transmitter-receiver unit, means for periodically energizing said unit to transmit time-spaced pulses of a predetermined dominant frequency in response to which said unit produces signals representative of acoustic vibrations including return echoes of said pulses, a pair of receiver channels connected to said unit including means for shifting the signal in one of said channels in time relative to the other by an amount less than the duration of said pulses to bring different portions of reflection components of the signals in said receiver channels into time coincidence, and means connected to said pair of channels for generating a pair of output pulses, one from each said signal, each dependent solely upon occurrence therein of components having frequencies within a narrow band of echo signal frequencies centered at said dominant frequency, and means for generating an indicating signal dependent upon time coincidence between pulses in said signals.

* * * * *